Oct. 14, 1969  S. A. LIGUORI  3,472,587
PROJECTION SYSTEM

Filed Aug. 9, 1967  6 Sheets-Sheet 3

INVENTOR.
STEPHEN A. LIGUORI
BY Kenyon + Kenyon
ATTORNEYS

United States Patent Office 3,472,587
Patented Oct. 14, 1969

3,472,587
PROJECTION SYSTEM
Stephen A. Liguori, Park Ridge, N.J., assignor to Decision Systems Incorporated, Teaneck, N.J., a corporation of Delaware
Continuation-in-part of application Ser. No. 455,721, May 14, 1965. This application Aug. 9, 1967, Ser. No. 669,334
Int. Cl. G03b 21/26, 21/14, 21/28
U.S. Cl. 353—35                                                                    14 Claims

ABSTRACT OF THE DISCLOSURE

A projection system in which various images are superimposed upon one another on a viewing screen. In one embodiment (FIG. 2) a projector projects an image from a slide through one of two separate working surfaces onto a viewing screen. The working surfaces are employed by the projectionist to overlay material on the projected image. With a moving mirror device positioned between the projector and the working surfaces he can optically switch between the two working surfaces to fade in the added material without having his actions in drawing the overlay material noticed by the audience. Alternately (see FIG. 9), the projector and slide can be optically downstream of the two working surfaces as long as there are light sources behind the working surfaces and the slide projector. Other apparatus projects a moving medium such as fire, smoke or water onto the viewing screen. In FIGS. 5 and 7, a rotating mirror and a dove prism are jointly employed to cause a medium image to appear in motion on the viewing screen. In FIG. 10, two spaced, independently rotating, image carrying, discs are employed. In each case, the moving medium is projected through a third working surface.

---

This application is a continuation-in-part of co-pending application, Projection System, Ser. No. 455,721 filed on May 14, 1965, now abandoned.

This invention relates in general to a projection system and more particularly to a projection system which is adapted to add animation to the projected image from a standard small size transparency.

The major purpose of this invention and of the various novel devices and combinations disclosed herein is to provide a console in which a plurality of projectors may be used to project different images which are superimposed upon one another on an ultimate viewing surface.

One major application for such a console is for firefighting and instructional purposes and the disclosure herein will be directed to such an embodiment. In such an application, one projector will be used to project the basic scene, another projector will project moving flame, another will project smoke, and still another may project light which can be controlled so as to provide markers on the projected scene.

A further purpose of this invention is to achieve a great deal of flexibility so that the various animated motions can be interchanged quickly and inexpensively.

Another object of this invention is to provide a system sufficiently compact to be operated by a single operator.

A yet further purpose of this invention is to provide a means whereby the operator can write over the image being projected without the operator's actions being detected as such so that solely the end product of his writing over the image is viewed by the viewer.

Because of the great variability which it is the object of this invention to attain and the plurality of effects which it is desired to provide for selective individual or simultaneous use by the operator, it becomes a major purpose of this invention to provide all of the above purposes in a unit at minimum cost.

It is another purpose of this invention to provide a coordinated multi-projector system for superimposing a plurality of images on a single viewing surface in such a fashion that the images can be projected from standard small size projector transparencies yet will be presented for operator viewing and manipulation on work surfaces substantially larger than the standard transparency size; such work surfaces being provided along the optical axis at a position prior to the projection of the images onto the ultimate viewing surface.

In brief, and in the broader sense, this invention involves a system which interrelates a plurality of optical projection configurations. The system serves to superimpose the outputs of each projection configuration on the same viewing surface and to permit intermediate display of the image projected in each configuration on a separate working surface for operator viewing and adjustment. The system permits the addition of motion to a scene being projected and thus provides for operator controlled animation. This system provides control features for the operator so that not only are the various images projected by each projection unit superimposed in registration upon each other, but the operator may independently control the relative brilliance, degree of focus and area of the viewing surface covered by each image being projected. Further controls are provided for the operator so that the image or effect for which motion is provided can be controlled in such a fashion that the rate of motion and the direction of motion is under operator control. The purposes of flexibility and simplicity are achieved by this design by combining the use of small slides and a two stage projection arrangement so that art work can be applied by the operator on an intermediate surface, called herein the work surface, on which surface the image is of sufficient size to permit the desired precision in applying the art work.

Other objects and purposes of this invention will become apparent from the following detailed description and drawings, in which:

FIG. 2 is a mechanical and optical schematic elevation of the interior of the base of the FIG. 1 console. FIG. 2 can be considered as taken along the plane 2—2 of FIG. 1;

FIG. 4 is a mechanical optical schematic plan view of a portion of the head assembly of FIG. 1. FIG. 4 may be considered as a view along plane 4—4 of FIG. 1;

FIG. 5 is an optical schematic of a projection configuration for the projection of moving fire, smoke or water, thus illustrating a first means for creating a moving medium on the viewing surface; FIG. 5 being representative of either one of the right-most two projection systems in FIGS. 2 and 3;

FIG. 6 is a mechanical-optical schematic plan view of one of the reprojection units in the head assembly;

FIG. 7 is a mechanical-optical schematic of a second means for creating a moving medium on the viewing surface;

Figures 1, 8A, 8B:
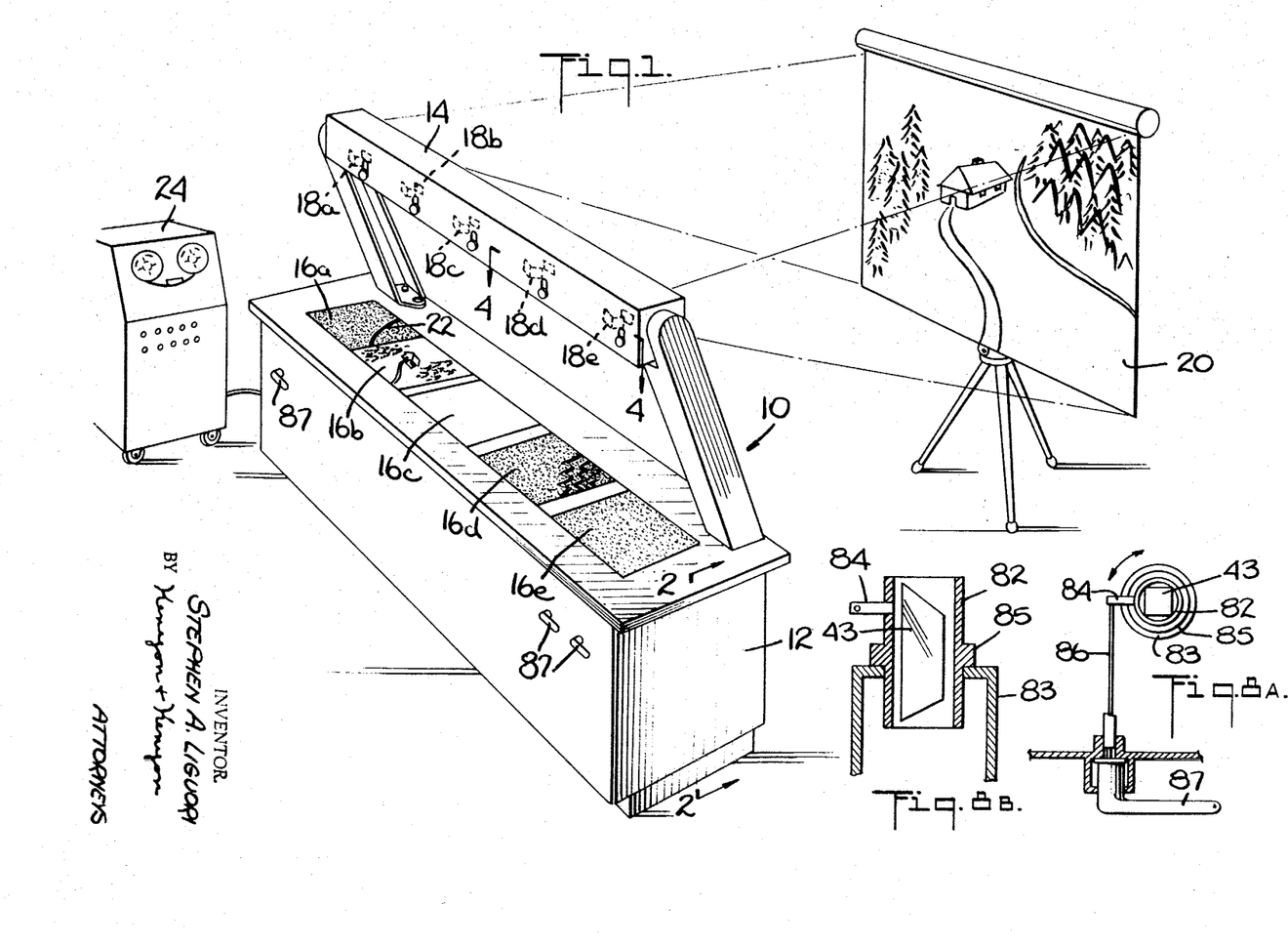
FIG. 1 is a perspective view of the system of this invention in the form of a console.
FIGS 8A and 8B are, respectively, plan and elevation views in partial cross-section of the rotation prism and holder employed in connection with the FIG. 5 projection arrangement.

FIG. 1 shows a console 10 embodying the system of this invention. The console 10 is constituted by a base unit 12 and a head assembly 14. Images or light or motion which are projected by the various projectors 28 within the base unit 12 appear on one or more of the five 10" x 10" work surfaces 16. Three of the work surfaces, 16a, 16d and 16e, are shown as being predominantly black because these three work surfaces are, in this embodiment, normally covered with a carbon film, part of which is scraped away by the operator to let through the desired light line or area over which it is desired to project a moving media such as flame, smoke, rain or flowing water.

In any case, whatever images are transmitted through these five work surfaces 16 are coned down by a condensing lens 26 (such as a fresnel lens) to be received by respective ones of the reprojection units 18 in the head assembly 14. Each one of the reprojection units 18 is angled so as to project respective images on the same viewing surface 20. Thus the plurality of images which are transmitted up to the head assembly 14 are superimposed on the ultimate viewing surface 20. In this fashion the scene projected on the work surface 16b may have animation added to it by means of fire shown in the upper right hand corner of the work surface 16d. A caterpillar line 22, representing a road which may be bulldozed out to prevent the spread of fire, can be shown by the operator by means of a line 22 drawn through the carbon black of the work surface 16a. The above illustrates but a couple of the simpler effects that may be achieved. Other effects which will highlight the flexibility of this invention will be discussed further on. The cabinet 24 shown in FIG. 1 is a source of auditory effects which may or may not be employed, depending on the ultimate application for the system.

Figure 2:
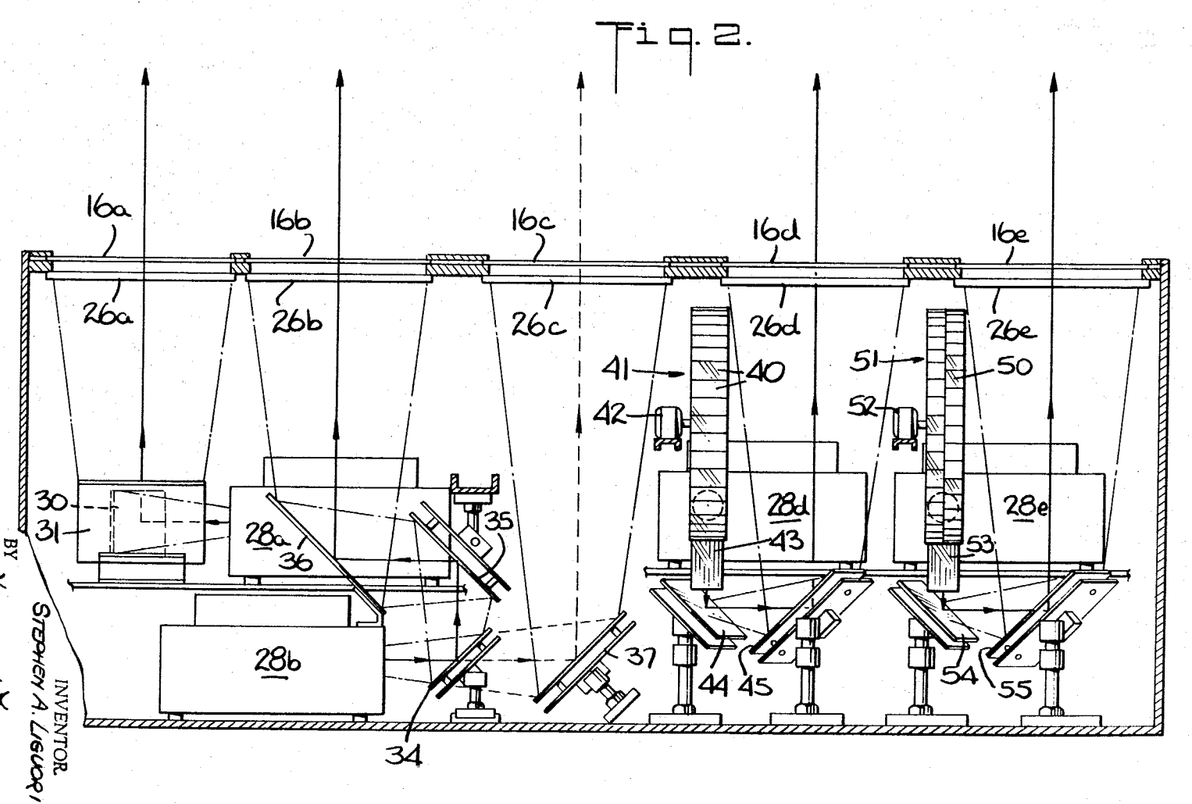
Figure 3:
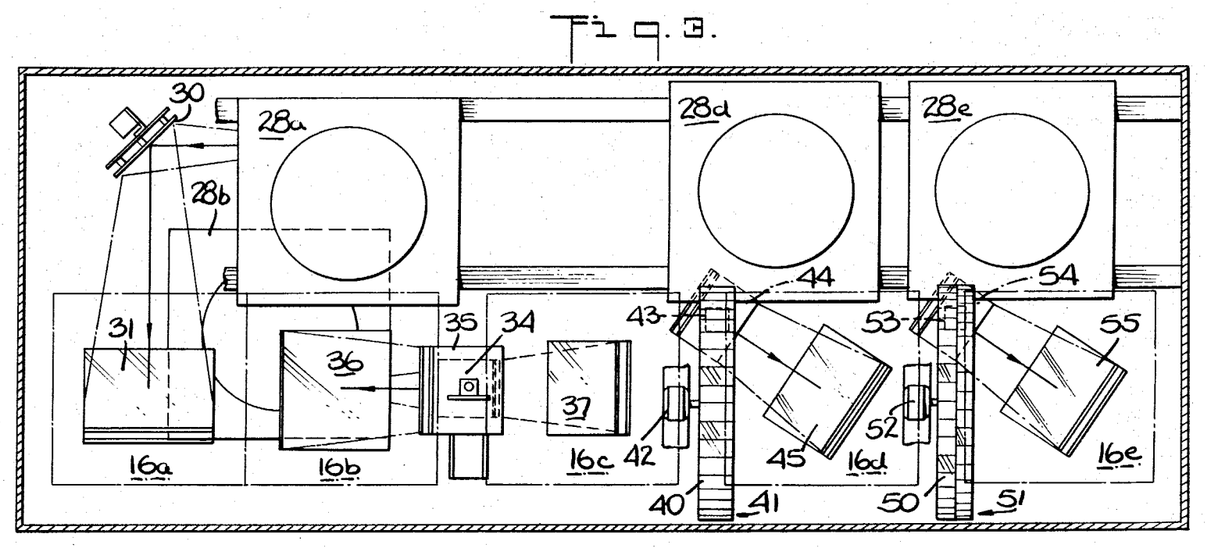
FIG. 3 is a mechanical schematic plan view of the interior of the base of the console of FIG. 1.

FIGS. 2 and 3 are mechanical and optical schematics of the interior of the base 12 showing the various arrangements and techniques employed to obtain the different images or effects on the five work surfaces 16a through 16e. FIGS. 2 and 3 are easiest understood by considering the arrangement for each work surface separately. However, there is one consideration that should be kept in mind in connection with all five of the work surfaces. Immediately behind each work surface 16 there is located a fresnel lens 26. The fresnel lens 26 serves to converge the light leaving each work surface. In this fashion the respective reprojection units 18 may be placed at the area of convergence of each light cone so that each reprojection unit 18 can be made a minimum size.

In order to attain a certain uniformity of reference designations, corresponding units associated with corresponding work surfaces 16 will be given the same designated numeral and will be generally referred to by that designated numeral. When it is desired to make a specific reference to one of the corresponding units, then a small letter suffix will be employed and used for such designation. Thus the fresnel lenses are given the general designating numeral 26 and are shown as five separate fresnel lenses enumerated 26a through 26e in order to permit separate identification where desirable.

In accordance with this designating numeral convention, there are four projectors 28, one of which 28b projects an image onto either or both the work surfaces 16b and 16c depending on the position of a movable mirror to be described below.

The first working surface

First of all, however, the projector 28a simply projects a beam of light onto the underside of work surface 16a. The mirrors 30 and 31 serve to direct the light onto the work surface 16a and to make sure that it travels a path sufficiently long so that it covers the entire ten inch square work surface 16a. The work surface 16a is in fact composed of a glass plate on top of which a carbon covered sheet of acetate has been laid so that no light initially passes through the work surface 16a. However, the operator, by scratching a line through the carbon on the work surface 16a, can permit light having whatever configuration is drawn by the operator to pass through the work surface 16a. In the particular application for this invention herein described, the operator may use the work surface 16a in order to illustrate a road bulldozed by fire fighters in order to prevent the spread of a forest fire. In order to illustrate a road, the light beamed by the projector 28a is given an appropriate color for this purpose.

The second and third working surfaces

The projector 28b projects the full scene that is to be viewed, which in this embodiment is shown as a house having two clusters of trees on either side of it. This scene projected from a standard 2" x 2" slide appears on the work surfaces 16b and/or 16c as a full 10" x 10" image, which is a size convenient for employment by the operator to point to objects or to otherwise modify the scene in any one of the fashions described herein.

In a first position, the mirror 34 intercepts all of the light beamed by the projector 28b and reflects all of the light onto the work surface 16b by means of mirrors 35 and 36.

In a second position of the mirror 34, the mirror 34 is completely removed from the path of the beam out of the projector 28b and, in that case, the beam is reflected by the mirror 37 onto the work surface 16c. Of course, in both cases, the path of the beam is made equal and of such a length that the image being projected by the slide projector 28b is placed in focus at the plane of the top facing the working surfaces 16b, 16c. Nominally, both of the working surfaces 16b and 16c are transparent glass plates so that the image will be seen on the surface and yet will be passed through the surface for the purpose of ultimately being projected onto the viewing surface 20.

The movable mirror 34 is located as close as possible to the output lens in the projector 28b and thus is located in a position of the light beam where there is a maximum amount of defocusing. The mirror 34 can then be moved to a position part way in between the two positions described above so that part of the light beam emitted by the projector 28b is reflected onto the working surface 16b and another part is reflected onto the working surface 16c. Because the mirror 34 is located at a position along the optical axis very close to the projecting lens within the projector 28b, both of the images on the working surfaces 16b and 16c will be complete images whose intensity is somewhat less than would be the case if the mirror 34 were in either end position.

There is a real advantage to the operator in this arrangement where the scene may be projected onto either one or both of two working surfaces 16b, 16c. For example, he can overlay one of the working surfaces (for example working surface 16c) with markings while employing projection of the image through the working surface 16b to provide a full undisturbed image for viewing by the audience. Then by moving the mirror 34 from its first position to its second position, the markings overlaid on the working surface 16c will be superimposed on the image seen on the viewing surface 20. Thus, if one portion of the scene has been subjected to fire and the operator wishes to show that portion as char, he can overlay that portion of the scene with a carbon or black waxy pencil without in any sense disturbing the scene by the audience. Then, when he wishes to have the char appear, the operator simply moves the mirror 34 along its track to its second position and the scene will appear obstructed by the area charred in by the operator.

It must be remembered in connection with this description of the relationship between the image projected on the working surface 16b and the image projected on the working surface 16c, that both of these images are projected in registration on the same viewing surface 20. This registration is achieved by means of the fact that the reprojection unit 18b and reprojection unit 18c are placed at an appropriate angle to project whatever image is received by those reprojection units 18 onto exactly the same area of the viewing surface 20.

It should be noted that, because the working surfaces 16b and 16c are glass plates and the fresnel lenses under them are also transparent, only a faint image of the scene being projected will be visible. This faint image is visible on the face of the working surfaces 16 only because of optical imperfections.

In order to have char appear as such on the viewing surface 20, the grease pencil markings must be defocused. Thus, where it is char that is overlaid on the scene, the top face of the working surface 16 itself is not the plane onto which the projector 28 focuses the slide image. Accordingly, the faint image seen on the working surfaces 16b and/or 16c is seen as displaced somewhat below the working surface; at least in the application for the system described herein where it is desired to defocus the art work overlaid on the working surfaces 16b and 16c.

With the above description of the projection configurations relating to the second and third working surfaces 16b and 16c in mind, it can be seen that the movable mirror 34 acts as an optical switching device to change the optical coupling between the slide projection 28b and the working surfaces 16b and 16c. From the mirror 37 onto the screen 20, there is constituted a first optical configuration which includes the working surface 16c. From the mirror 35 onto the screen 20, there is constituted a second optical configuration which includes the working surface 16c. The projector 28b is a third optical configuration which is alternately coupled to either the first optical configuration onto the second optical configuration by the mirror 34.

The fourth and fifth working surfaces

In the embodiment being illustrated, the fourth working surface 16d is employed to transmit an overlay of fire to a portion of the scene being viewed. To give the effect of moving fire, a slide with art work representing nothing but fire is employed in the projector 28d. The projection from the projector 28d is first reflected by individual mirrors 40 on a drum 41 kept in rotation by the motor 42. Each mirror 40 is an individual flat mirror two inches across by ¾ inch along the periphery of the circular drum 41. The diameter of the drum 41 of mirrors 40 is approximately fourteen inches. Thus successive mirrors are at a slight angle to one another. The cone of light beamed out from the projector 28d is intercepted by the drum 41 at a position such that two or three of the individual mirrors 40 at a time are always in position to reflect the cone down toward the mirror 44 from whence the light is reflected to the mirror 45 and thence ultimately to the underside of the working surface 16d.

The fire image reflected down by the mirrors 40 to the mirror 44 is caused to pass through a dove or like rotation prism 43. The dove prism 43 is mounted so that its angular position can be selected by the operator. This may be achieved by mounting the dove prism 43 in a cylinder which is connected by means of a throttle cable to a throttle knob at the rear panel of the base 12. The mounting of the prism 43 is such that the operator can rotate the prism at least 90° which serves to rotate the image being projected by as much as 180°. In this fashion, the direction of the movement that is imparted to the image by the moving drum of mirrors 40 may be controlled by the operator. If it is desired to have the fire move from left to right on the viewing surface 20, the dove prism 43 will be in a first position. If, however, it is then desired to have the direction of motion go from bottom to top of the viewing surface 20, the dove prism 43 is rotated 45° in one angular direction by the operator.

Because each of the individual mirrors 40 are always in movement, as the drum 41 is continuously rotated, the image of fire being projected by the slide projector 28d is continuously being swept across the face of the mirror 44 and thus across the working surface 16d. The direction of this sweep is determined by the angular position of the dove prism 43. Because the small individual mirrors are located close to the lens of the projector 28d, each successive mirror reflects an image onto the working surface 16d that overlaps both the preceding and succeeding image. Thus the impression of continuously moving fire can be attained across the entire working surface 16d.

In operation, the working surface 16d is initially covered by a sheet of clear acetate that has an opaque carbon film on its surface. This carbon covered acetate sheet is readily available and has been used in the projection art for the general purpose indicated herein. The carbon film may be readily scraped away in whole or in part by the operator; as he desired.

Thus, if the operator wishes to show fire over any given portion of the image being projected on the viewing surface 20, he merely scrapes away the carbon film over the corresponding area and fire will be projected through to appear on the viewing surface 20. When it is desired to show a portion of the fire as having been abated, thus leaving char, the operator covers the corresponding portion of the working surface 16c with a black charcoal marker and moves the mirror 34 into its second position so that the image is switched from the working surface 16b to the working surface 16c. Then, by reproducing the char on the working surface 16b and adding small additional amounts of char, and switching the image back and forth between the working surfaces 16c and 16b, a buildup of char can be illustrated.

The operation of the projector 28e and associated mirrors in order to project an image of smoke onto the working surface 16e is essentially the same as is the operation of the arrangement employed in connection with the working surface 16d. Again, a drum 51 of individual small mirrors 50 is employed which may be either identical to the drum 41 or may be somewhat different as is illustrated in FIG. 2. These mirrors 50 are continuously rotated with the drum 51 by virtue of the motor 52 so that the beam of light projected from the projector 28e is reflected downward by the individual mirrors 50 onto the mirror 54, thence to the mirror 55 and ultimately to the underside of the normally opaquely covered working surface 16e. When it is desired to show smoke on the projection surface 20, the operator simply removes the appropriate area of carbon on the top of the surface 16e and smoke will show through. The projector 28e contains a slide depicting nothing but smoke; which smoke is seen as in motion by the sweep across the mirror surface 54 that is effected by the rotating individual mirrors 50.

As is illustrated in FIG. 2, the individual mirrors 50 may be one-half inch square mirrors in two adjacent banks around the periphery of the drum 51 and staggered so that the image projected on the working surface 16e is somewhat blurred. This blurring is desired since it makes the preparation of the individual slide employed in the projector 16e much simpler. Smoke looks more like smoke if in fact it is blurred. The blurring occurs because each of the individual mirrors 50 reflects the total image from the slide onto the working surface 16e. Thus by having adjacent mirrors 50 reflect the same image on the same surface, greater blurring is obtained and a better smoke effect achieved.

The image projected onto the working surfaces 16d and 16e are oversized so that the diameter of the cone of light impinging on the working surfaces 16d and/or 16e has a diameter approximately one or two inches greater than the corner to corner dimension of these two working surfaces. This oversized image assures that there will be no gap between the image as reflected by successive adjacent mirrors 40.

One of the advantages of using the rotating drums 41 and 51 of mirrors in lieu of a device such as a rotating film strip belt is that the illustrated arrangement provides greater flexibility and makes it possible for the operator to very quickly switch from a slide that projects one type of image to a slide that projects another type of image without having to go into the unit and replace the film belts. Thus, in this illustrated embodiment, a standard two inch by two inch transparency is employed which projects a still image that is given motion by means of mirrors 40 or 50. If the operator wishes to show rain instead of flame, he simply switches the slide in the projector 28d or 28e

The head assembly

The five reprojection units 18 within the head assembly 14 are each structurally identical. Two of these identical reprojection units 18 are illustrated in plan view in FIG. 4. However, initial comprehension of the arrangement of the reprojection unit 18 is best obtained from the perspective view shown in FIG. 5. Although FIG. 5 is a perspective schematic of a complete one of the four individual projection arrangements, attention is directed at the moment solely to the upper portion which is designated as the reprojection unit 18d.

Figures 5, 6, 7:
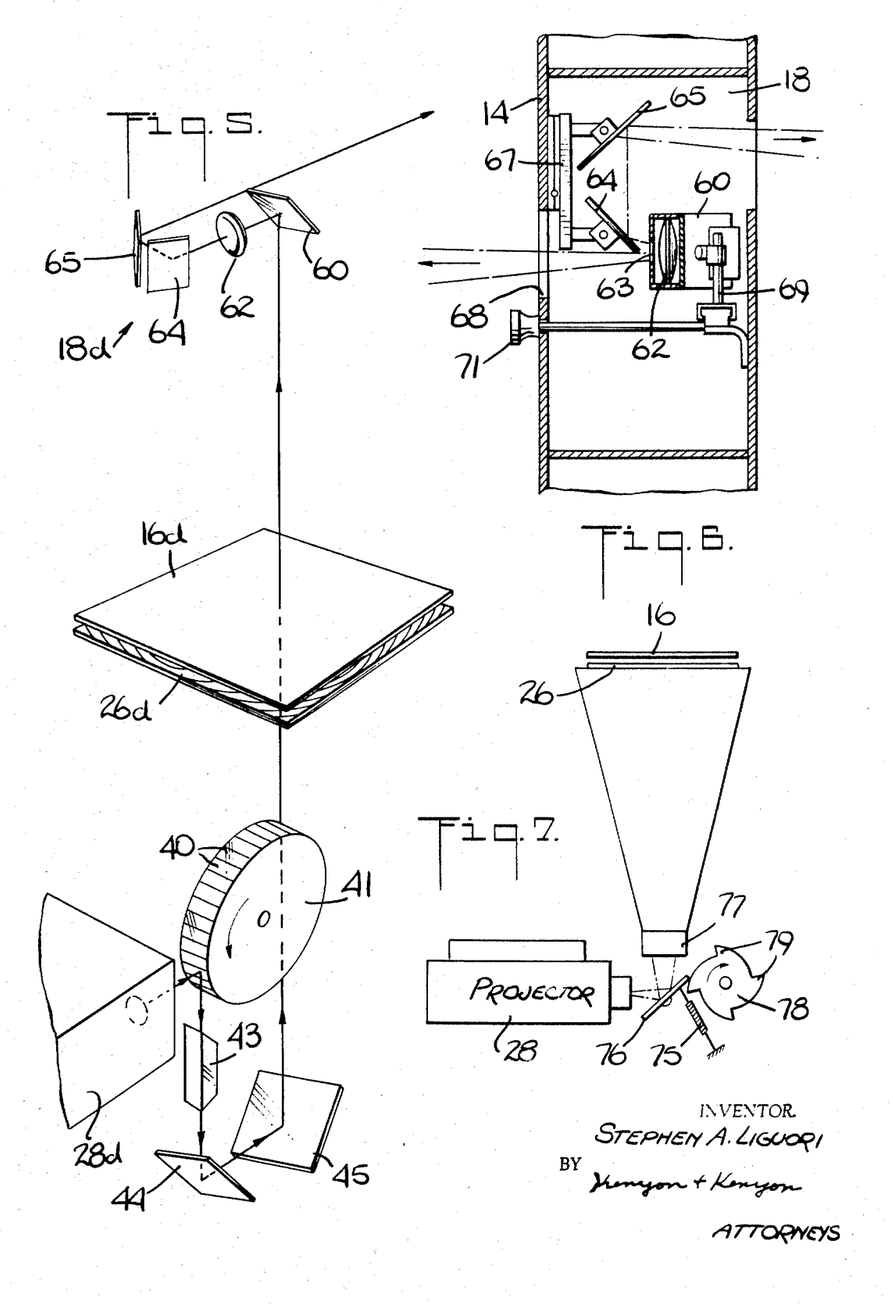

With reference specifically to FIG. 5, the light beam from the working surface 16d (as an example) is coned down by virtue of the fresnel lens 26d so that the entire beam is intercepted near its apex by the relatively small mirror 60 which mirror 60 is tilted at an angle 45° to the optical axis of the beam so that the beam's optical axis is turned 90° on reflection from the mirror 60. The beam then passes through a projection lens 62 which serves to expand the beam and projects it ultimately onto the working surface 20 for viewing. Two mirrors 64 and 65 serve to reverse the optical axis of the beam so that the image may appear on a projection surface 20 which is located in front of the operator. By means of this arrangement of mirrors 60, 64 and 65, the console 10 of this invention may be located at the rear of an auditorium with the operator standing behind the console so that the operator as well as the audience is able to view the image being projected in front of him.

Figure 4:
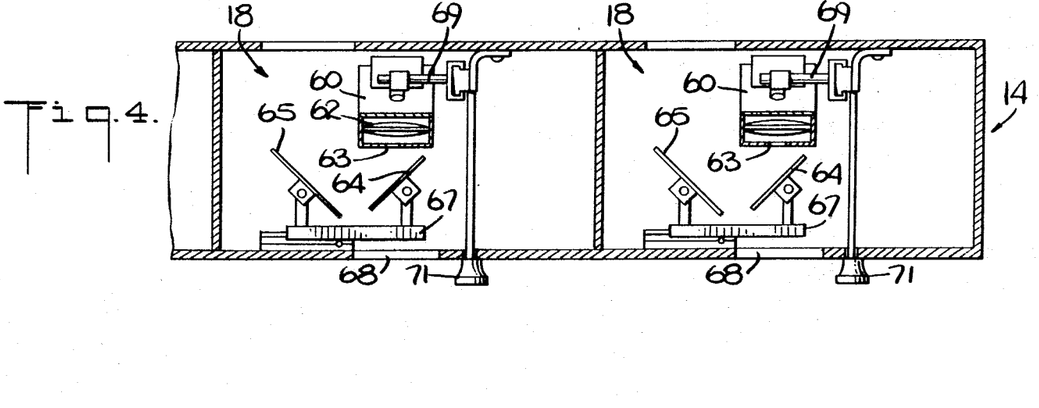

As shown in FIG. 4, a variable aperture 63 of standard design is employed at the output of the reprojection lens 62. The opening of this variable aperture is controllable by the operator so that the brightness of each image as seen on the viewing surface may be independently controlled by the operator. It would also, of course, be possible to control the brightness of each image on the viewing surface 20 by having independent variable resistors in series with the power supply to the light system in each of the projectors 28.

The arrangement of three mirrors 60, 64 and 65 (rather than a single mirror tilted perpendicular to the position shown for the mirror 60) in order to project the image onto the viewing surface 20 is employed to establish a positional correspondence between the images on the working surface 16 and the image as seen by the operator on the viewing surface 20. Thus this three mirror arrangement is necessary so that when the operator, for example, scrapes away a portion of the upper right hand corner of the working surface 16d, the effect of fire thereby let through will appear in the upper right hand corner on the viewing surface 20. If a single mirror were employed, the upper right hand corner of any one of the working surfaces 16 would correspond to the lower left hand corner of the image seen on the viewing surface 20.

Defocusing arrangements

To achieve effective animation and in particular to permit this console to be operated by an operator who is not skilled at art work, a number of adjustments are provided and necessary. For example, in order to properly project smoke, two defocusing arrangements are provided.

First, is a means for defocusing the projection from the projector 28e by means of an operator controlled button which moves the position of the lens in the projector 16e. This is done in any one of the well-known standard fashions. Projectors are now available on the market with a remote control button for positioning the lens. In this fashion a slide may be employed which does not, when in focus, project as smoke but which upon defocusing will cause the entire working surface area, if uncovered, to look as if it were entirely filled with smoke.

When smoke is desired over a portion of the image, such as coming from a chimney on a house, the operator will scratch a small area out of the carbon on the working surface 16e so that smoke can appear through. However, the area that he scratches out will have a clear line demarcating its boundary and thus will not give the full effect of smoke on the ultimate viewing surface. In order to provide the effect of smoke for the viewer, the operator adjusts the vertical position of the bracket 69 in the head assembly 14 by turning the knob 71, thereby changing the position of the reprojection lens 62 along the optical axis. In this fashion he can defocus the area, which he has cut out of the working surface 16e (through which smoke is being projected) so that on the ultimate viewing surface 20 the smoke will not appear as if it were constrained within the precise cut-out area and thus will give the full impression of smoke. This defocusing of the reprojection unit 18e is the second defocusing arrangement provided.

A similar dual defocusing arrangement is useful in projecting flame, although the amount of defocusing need not be as great as it is when smoke is projected.

The above two defocusing capabilities for each of the five optical axes of projection are important in establishing the flexibility required for this system and make it possible to use the system of this invention in many different applications and to display many different types of moving elements. For example, if rain or flowing water is desired to be shown, the nature of the defocusing and the nature of the way in which the carbon black on the working surfaces is cut away may have to be varied somewhat but the potentiality for projecting rain, water, clouds, or other effects is inherent in the design of this system.

Other features

In order to enhance the ability of the operator to properly scratch away or mark particular portions of the various working surfaces 16, the operator may employ a standard lucidite (not shown) which is readily available on the market and is frequently used in surveying. The lucidite presents a picture to the operator that superimposes the screen image and an image from any one of the working surfaces. The operator can then place his grease pencil or knife for scratching away part of the carbon at exactly the places and points that he wishes.

An additional feature which may readily be built into the reprojection units 18 is best illustrated in FIG. 6. In FIG. 6, the mirror 64 is shown as mounted on a bracket 67 which may be moved by the operator along a horizontal plane perpendicular to the light incident on the mirror 64. In this fashion the image projected by the lens 62 may be made to fall in back of the operator as well as in front of him. Or, alternately, as is shown in FIG. 6, the mirror 64 may be so adjusted that half the light projected by the lens 62 is reflected from the mirror 64 and thence ultimately onto the front viewing surface 20 while half the light from the lens 62 passes on one side of the mirror 64 and out the opening 68 in the back of the head assembly 14 to be received on a viewing surface which is located behind the operator and, in one embodiment, is received in a different room.

In one particular application, this use of a front projection and a rear projection has been employed to test and instruct in communication for fire fighting. Thus one audience would be shown the entire image projected onto a screen and the other audience would be shown only a portion of the image. This portion could be attained by having a small screen which is movable in the plane of the viewing surface and which absorbs light over all but a predetermined segment of the screen. Thus the group viewing only a segment of the screen would be in a position where they could be instructed as to how to make decisions depending upon what is orally communicated to them from a person who views the entire scene. Alternatively, both viewing audiences may be shown different segments of the same scene and their ability to communicate the entire picture to one another thereby tested.

It should be recognized that the entire image can be made to appear on both the viewing surface 20 and on whatever viewing surface is behind the operator when the mirror 64 is in the position shown in FIG. 6. The reason the images projected are complete images essentially resides in the fact that the mirror 64 is positioned as close as possible to the lens 62 so that the image at the position of the mirror 64 is thoroughly defocused. Thus each segment of the beam of light at that position close to the lens 62 contains information which when received in a focused position sufficiently distant from the lens 62, will be the entire image being projected. However, each of the two images on the forward and back viewing surfaces will have half the intensity that one of the images alone would have.

The mirrors 64 and 65 are mounted on a bracket 67 which bracket can be rotated slightly about a vertical axis in order to adjust for registration of the five images that are projected onto the working surface 20. In this fashion, the axis of projection from each of the five mirrors 65 are adjusted to intersect at the center of the viewing surface 20.

When the image being projected is to be viewed on both the forward viewing surface 20, as shown in FIG. 1, as well as on a rear viewing surface (the mirror 64 then being in the position shown in FIG. 6), a somewhat more complicated adjustment procedure is involved. Under that circumstance, the mirror 60, lens 62 arrangement is also made adjustable by being rotatable about a vertical axis. To achieve proper dual registration, the mirrors 64 are moved entirely out of the way so that only the rear image is seen. The bracket 69 (for each unit 18), on which the mirror 60 and lens 62 are mounted, is then rotated about a vertical axis until the image being projected to the back from each unit 18 is in registration with all the other images being projected back. The bracket 67 is next moved longitudinally to cause the mirror 64 to intercept a portion of the light from the lens 62. The mirrors 64 and 65 are then rotated about a vertical axis until all five images are also in registration on the forward viewing surface 20.

A simple and fairly standard cable and throttle mechanism is employed to provide the operator with the ability to rotationally position the dove prism 43 and 53.

As may be seen in FIGS. 8A and 8B, the dove prism 43 is held within a first cylinder 82, which cylinder 82 is rotatably mounted on a larger fixed cylinder 83. The cylinder 82 is coaxial with the cylinder 83 and extends above the cylinder 83 so that a radial rod 84 on the cylinder is free and clear of obstruction by the cylinder 83. A lip 85 supports the cylinder 82 above the cylinder 83 yet permits rotational movement of the cylinder 82 relative to the cylinder 83. A solid wire 86 is connected to the rod 84 and extends through a flexible cable (not shown) to a "throttle" handle 87 (see FIG. 1) which is located on the outside of the console cabinet for easy access by the operator.

In an embodiment constructed, a two inch pull on the throttle handle 87 causes the cylinder 82, and thus the dove prism 43 within it, to rotate 90° in one direction and a two inch push on the throttle handle causes the prism 43 to rotate 90° in the other direction. Thus a 180° total excursion is obtained with the consequent 360° rotation of the image being projected through the dove prism 43. The wire 86 that is employed akin to a piano wire having a rigidity sufficient to support itself yet capable of bending sufficiently under the pull and push of the operator so as to accommodate to the 180° rotation of the cylinder 82.

Although this invention has been described in detail in connection with a particular embodiment, the basic system has been designed so that a great deal of flexibility in use and application may be had.

For example, among the many variations which could be incorporated in the system of this invention is the employment of a motion picture camera or other motion projection device in lieu of any one of the projectors 18. Thus, for example, a man descending in a parachute could be shown by projection from an appropriate motion projector in lieu of the projector 28a. Similarly, an airplane could be shown as flying across the scene. These and many other variations in the animation potential of this system are available because of the system design which brings into cooperation a plurality of projection arrangements, each having a separate optical axis.

In the embodiment described above, there are four complete projection configurations from projector to viewing surface, each configuration including not only the projector but at least one work surface 16 and the reversal optics in the head unit. One of these four major projection configurations has two parallel branches running from the switching mirror 34 in front of the single projector 28b through the two work surfaces 16b and 16c and the two head units 18b and 18c to the single viewing surface 20. These four projection configurations are combined and co-ordinated with one another so as to serve as a single integrated system which is embodied in the console described herein. However, any number of projection arrangements can be combined in the fashion disclosed herein to provide any desired degree of flexibility.

The fresnel lens 26 is the preferred form of condensing lens to be used because of its compact size and shape. However, there is no reason why the condensing element could not be supplied by a regular set of condensing lenses or even by an appropriately curved mirror.

The position of the drum 41 of mirrors 40 is determined by a desire to have the drum diameter as large as possible so as to minimize the gap between the image being projected from adjacent mirrors 40 as well as by the necessity to maintain an appropriate length for the path of projection so that the image on the slides in the projectors 28d, 28e, will be appropriately focused or "defocused" near the plane of the work surfaces 16d, 16e. However, it is consonant with the system of this invention for the drums 41 and 51 to be located anywhere along the optical axis of the light being projected. Thus it would be possible to design an axis of projection such that the rotating drum of mirrors would be in a horizontal plane rather than the vertical plane shown. It would also be possible to introduce the effect of motion by other means than by use of these rotating drums 41 and 51 but other means that have been employed have been found less desirable for varying reasons so that the embodiment illustrated is a preferred and optimum embodiment.

Similarly, since the position of the drums 41 and 51 can be varied, so can the position and the number of mirrors employed to reflect the image onto the working surfaces 16 be varied. The arrangements shown have been found to employ the minimum number of mirrors consonant with obtaining an appropriate length for the axis of projection to the work surfaces 16 and consonant with the desired flexibility for the employment of the system of this invention.

It may be noted that the projection of five images in registration onto the same viewing surface will require that the optical axis for some of the images will be other than perpendicular to the viewing surface so that perfect uniformity of focus for certain of the images may not be attained. However, whatever variation in focusing is thereby introduced in the practical system under discussion here is negligible and does not affect the superimposed image as viewed by the human eye. In the system being described, the throw from the reprojection units 18 to the viewing surface 20 is some twenty-two feet so that the ten inch displacement between respective reprojection units 18 at that distance from the viewing surface does not create an observable problem. However, if this unit is employed for substantially shorter throws, it might be desirable to compensate for this type of focusing error by any one of a number of techniques. For example, certain of the images could be projected along an axis perpendicular to the viewing surface in such an oversized condition that only the portions which overlap are employed. This would involve some loss of light and certainly would not be necessary for the projection of smoke and fire which are defocused in any case but could be employed to obviate any optical misalignment or differential focusing which might be undesired for one or more of those images which have to be received in relatively well focused condition.

The carbon covered sheet of acetate which has been described as the means for blocking light through certain of the work surfaces 16 and permitting the operator to selectively allow light through the work surface by crossing out the carbon could be dispensed with and a removable opaque paint applied directly to the transparent work surface 16.

The versatility of the system described could be further enhanced by mounting the mirror 30 in the first projection arrangement so as to be rotatable, at the will of the operator, through one or more arcs. With a couple of degrees of rotational freedom, the operator could move the mirror 30 so as to position whatever object may be projected by the projector 28a onto any location in the scene being projected by some other projector. Thus, for example, instead of merely projecting light as in the embodiment described, the projector 28a could be used to project the image of a man in a parachute. The mirror 30 could be rotated along one degree of freedom to position that man in the parachute anywhere along a horizontal axis of the viewing area 20. The operator, by then rotating the mirror 30 around a second axis, could cause the image of the man in the parachute to descend vertically across the scene being viewed. This is but one more example of the vast flexibility which is inherent in the design of this system.

FIG. 7 provides one example of the variation in the structures disclosed to obtain a result that in combination with the rest of the results described constitute the system of this invention. Specifically, FIG. 7 shows a technique for imparting a motion to a slide image and thus a technique that might replace the drum 41 of mirrors 40.

In FIG. 7, the projector 28 emits a beam, which for the sake of this description and for ready comparison with the disclosure above, may be an image of fire. The beam is intercepted by a spring 75 loaded mirror 76 and reflected by the mirror 76 through a dove prism 77 to be reflected onto a work surface 16. In order to achieve the effect of motion, a cam 78 having four lobes 79 is incorporated which continually rotates in a clockwise direction as seen in FIG. 7. As the cam 78 rotates, the mirror 76 rides on one of the lobes 79 thereby being driven over a counterclockwise arc. At the end point of each lobe 79, a sharp break permits the spring 75 to cause the mirror to quickly retraverse the arc in a clockwise direction so that the mirror 76 can be moved through a counter-clockwise arc again. In this fashion the mirror 76 is caused to oscillate in a sawtooth pattern which will cause the flame image projected to sweep across the work surface 16.

Figure 9:
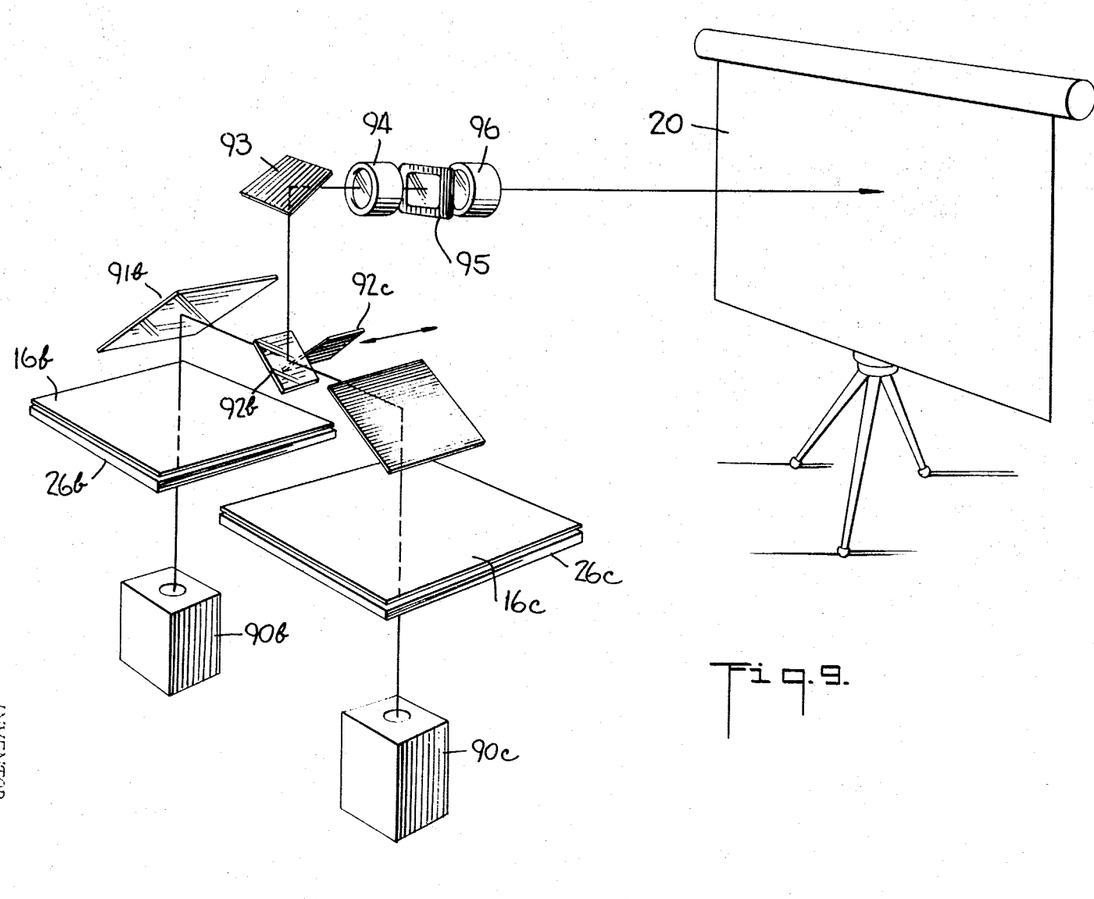
FIG. 9 is a mechanical-optical schematic in perspective of an alternate method of providing superimposition of operator applied art work on the image being projected.

FIG. 9 illustrates a further variation on the optical configuration that may be employed in connection with the second and third working surfaces 16b and 16c. The FIG. 9 configuration differs from the configuration illustrated in FIGS. 1 through 4 in a number of respects, the most significant of which is that the optical switching means (the movable mirror 34 in FIG. 2) is moved from the base unit 12 to the head unit 14 where the movable cross mirrors 92b and 92c perform the optical switching function. This optical switching function is one that selectively and alternately couples the optical configuration that includes the first working surface 16b and the optical configuration that includes the second working surface 16c to an optical configuration that includes the slide projector. Because, in the FIG. 2 embodiment, the slide projector 28b is in the base unit 12, the optical switching means must be in the base unit 12. However, in the FIG. 9 configuration, by placing the slide projector (represented by the lens 96 and by the slide 95) in the head unit 14 it becomes possible and indeed necessary to place the optical switching means in the head unit 14. As will become clear from the following description of the FIG. 9 configuration, one of the major advantages of this "reversal" of the position of the slide projector and optical switching means is that it eliminates the problem of registering two separate images on the screen 20.

In FIG. 9, two light projectors 90b and 90c are posi- projectors 90b, 90c and the fresnel lenses 26b and 26c. and the working surfaces 16b, 16c respectively. In the FIG. 9 variant, this is all that is required in the base unit. Neither a projection lens nor a slide holder is contained in the base unit.

However, the head unit, as a consequence, is more complex than is the head unit 14 employed in the FIG. 1 embodiment. The light from the light sources 90b and 90c is coned down by the fresnel lenses 26b, 26c respectively. These cones of light are intercepted by the mirrors 91b and 91c, which mirrors are set at a 45° angle to the horizontal so that the vertical cones of light are reflected in a horizontal direction. The reflecting surfaces of the two mirrors 91b and 91c face each other so that the two cones of light reflected therefrom are directed toward crossed mirrors 92b and 92c.

It might be noted at this point, that the angle of convergence of the cones of light created by the fresnel lenses 26b, 26c may be affected or modified by employing condensing lenses in the base unit between the light projectors 90b, 90c and the fresnel lenses 26b and 26c. In one embodiment a standard projection lamp was employed for the light projectors 90b, 90c, which standard lamp had an internal angle by which standard lamp produced a diverging cone of light having an internal angle to the axis of the cone of about 40°. The use of standard condensing lenses were employed to this angle down to approximately 20°. As a consequence a more rapid convergence could be obtained from the use of the fresnel lamp than would be obtained without the condensing lenses. However, the geometry of the configuration, and the particular nature of the light source 90b, 90c would determine the necessity or desirability of these condensing lenses and thus, for ease of comprehension, these condensing lenses are not shown in the FIG. 9 embodiment.

These two crossed mirrors 92b and 92c are horizontally displaced from one another, as is shown in FIG. 9, and are mounted so that they may be moved in a horizontal direction parallel to their "geometric" line of intersection. In one extreme position of these two crossed mirrors 92b, 92c the cone of light proceeding from the mirror 91b is reflected from the upwardly facing mirrored surface of the mirror 92b while the cone of light proceeding from the mirror 91c impinges on the non-reflecting, downwardly facing back of the mirror 92b. In the other extreme position of these crossed mirrors 92b, 92c the cone of light from the mirror 91c impinges on and is reflected by the upwardly facing reflective surface of the mirror 92c while the cone of light from the mirror 91b impinges upon the non-reflecting downwardly facing back of the mirror 92c. Thus the operator by selectively positioning these crossed mirrors 92b, 92c will determine which of the cones of light will be reflected up from the crossed mirror arrangement 92b, 92c. It should be noted that these two mirrors 92b, 92c are in planes perpendicular to each other and are each at an angle of 45° to the horizontal so that they serve to rotate the horizontal light beam from the mirrors 91b or 91c to a vertical light beam.

The mirror 93 is at an angle of 45° to the horizontal, thereby rotating whichever light beam is reflected upward by the crossed mirrors 92b, 92c into a horizontal direction so that the light beam can ultimately be viewed on the vertical screen 20. The mirror 93 can be considered the first element in an optical configuration that extends from the mirror 93 to the viewing screen 20. It may then be seen that the crossed mirrors 92b, 92c serve to selectively and alternately couple one of the two separate parallel optical configurations (each one of which includes one of the working surfaces 16b, 16c) to the optical configuration that starts with the mirror 93 and proceeds to the screen 20.

At this point it should be kept in mind that the horizontal light beam reflected from the mirror 93 does not yet contain a slide image but is modified, as far as its information content is concerned, only by whatever the operator may have placed onto the working surfaces 16b, 16c.

The light reflected from the mirror 93 (which may be, depending on the position of the mirrors 92b and 92c, either of the two beams of light) is intercepted by the projection lens 94. The projection lens 94 is located at approximately the apex of the coned down beams of light which proceed from and are coned down by the fresnel lenses 16b, 16c. The projection lens 94 serves to project whatever image has been placed on the working surfaces 16 onto the slide 95. In this fashion, the image of whatever art work has been overlaid onto the working surfaces 16b or 16c is overlaid onto the slide 95 for ultimate viewing on the screen 20. Of course, it must be kept in mind that the art work thereby projected is also a function of the horizontal position of the crossed mirrors 92b, 92c. It is the slide 95 which carries the main image that is to be seen on the screen 20. A second projection lens 96 then serves to focus the composite slide 95 and working surface 16 image onto the screen 20.

Where the art work placed on the working surfaces represents a medium, such as char, it may be desired to have the art work defocused as seen on the screen 20. In such case, the lens 94 is adjusted to project the art work to an image plane other than the slide 95 so that the projection lens 96 will project a defocused image of whatever is on the working surfaces onto the screen 20. Again, it may be noted that condensing lens may be employed to aid in the operation of a particular focusing lens. The light gathering power of the projection lens 96 can be kept to a more reasonable limit and thus the lens 96 be made a smaller and less expensive lens if condensing lenses are employed between the slide 95 and 96 in order to bring the diverging light which emerges from the lens 94 and passes through the slide 95 into a substantially cylindrical beam of light to be gathered and focused onto the screen 20 by the projection lens 96. Such a use of a condensing lends is a known expedient and in order to simplify the FIG. 9 illustration such condensing lens is not shown thereon.

In operation, one extreme position of the crossed mirrors 92b, 92c will result in whatever marking is on the working surface 16b being overlaid onto the image projected from the slide 94. The other extreme position of the crossed mirrors 92 will cause whatever marking is placed on the working surface 16c to be overlaid on the slide image as seen on the screen 20. Thus if the first extreme position of the crossed mirrors 92b, 92c is assumed, the operator can place art work (such as adding small amounts of char) on the working surface 16c and after he has laid the desired amount of char on the working surface 16c move the crossed mirrors 92b, 92c into their second extreme position so that the char will gradually be brought out on the picture which is being viewed on the screen 20. In this fashion, it becomes possible for operator drawn work to be added without the operator's drawing activities being viewed on the screen 20.

A comparison of the FIG. 9 optical configuration with the configuration shown in FIGS 1 through 4 will make clear that in the FIG. 9 configuration, the beam of light from the slide 95 to the screen 20 remains fixed as the mirrors 92b, 92c are shifted. By contrast the arrangement in FIGS. 1 through 4 requires that the beam of light which carries the slide image be optically switched from the working surface 16b to the working surface 16c as the mirror 34 is moved from one extreme position to the other. Thus in the arrangement shown in FIGS. 1 through 4 there is need for careful adjustment of the reprojection units 18b, 18c in the head unit 14 to assure registration of the slide image as it is shifted from the reprojection unit 18b, to the reprojection unit 18c.

By placing the slide projector in a head unit 14 and causing the optical switching to be performed at a point after the light has come through the two working surfaces 16b, 16c it becomes possible to avoid this registration problem.

Figure 10:
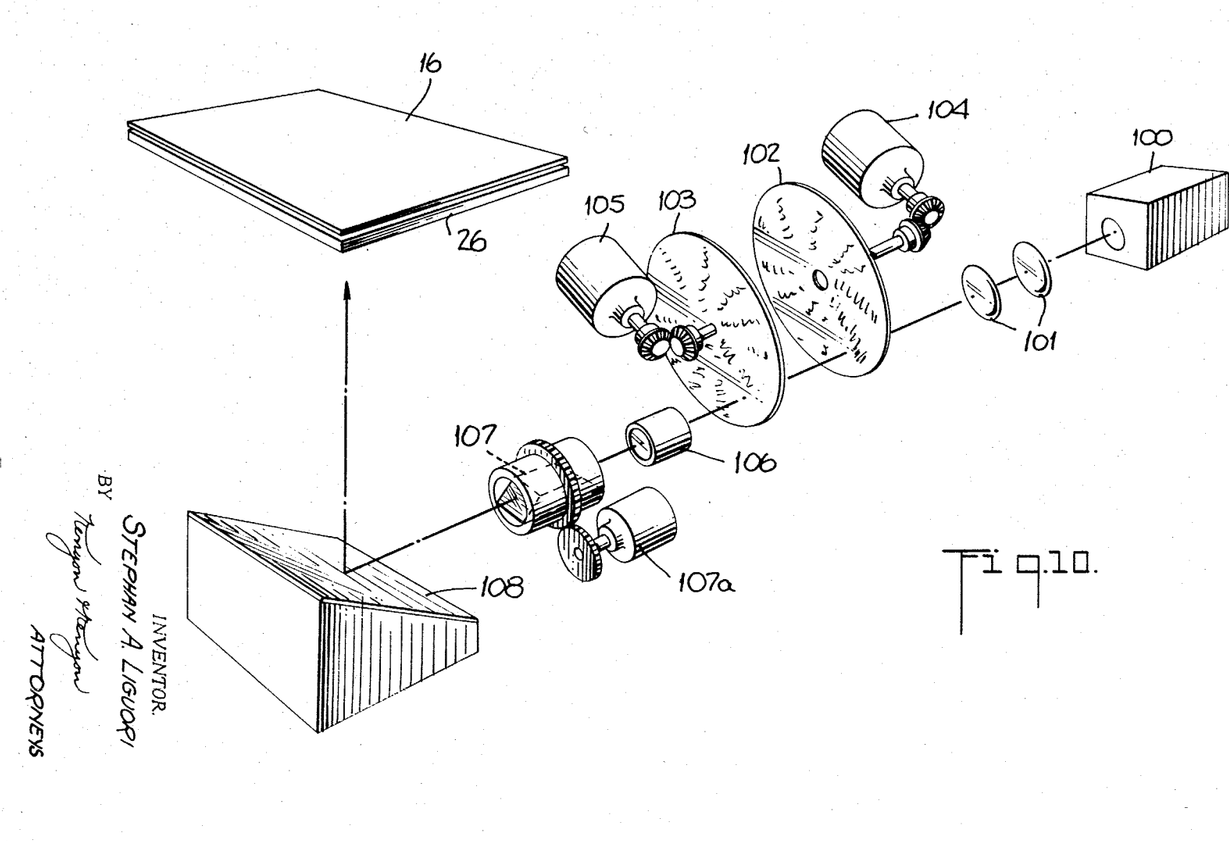
FIG. 10 is a mechanical-optical schematic in perspective of a third means for creating a moving medium on the viewing surface.

FIG. 10 provides yet a further example of a variation in the means that may be used to obtain the moving media effect. FIG. 10 thus shows a technique that might be used in lieu of the drum 41 of mirrors 40 illustrated in FIG. 5 or the oscillating mirrors 76 technique illustrated in FIG. 7.

In FIG. 10 a lamp source 100 and condensing lens 101 provide a beam of light which passes through two separate, closely spaced rotating discs 102 and 103. These discs 102, 103 are transparent except for the fact that they have on them the media, such as smoke or fire, which it is desired to place on the working surface 16. Thus these discs 102, 103 take the place of the media slides that are employed in the FIG. 5 or FIG. 7 embodiments. Separate motors 104 and 105 are employed to permit rotating the discs 102, 103 at different speeds and/or in different directions at the same time.

The light beam which passes through the two discs 102, 103 picks up the image of the desired medium, such as smoke or fire. The projection lens 106 serves to project the medium image onto the working surface 16. The rotational position of the dove prism 107 determines, in the same fashion as does the dove prism 43 in the FIG. 5 embodiment, the direction of travel of the moving smoke or fire across the viewing screen 20. A mirror 108 placed at 45° to the horizontal direction rotates the light beam to a vertical direction so that the beam of light will fall on the underside of the working surface 16. The fresnel lens 26 serves the same purpose as has been discussed in connection with the other embodiments of this invention.

One of the advantageous features of this FIG. 10 embodiment is that the two discs 102, 103 are spaced from one another so that one of the two images may be made slightly out of focus relative to the other image. This means that, for example, the disc 102 may provide the dominant, more or less in focus, smoke image moving across the screen 20 while the disc 103 can be used to provide a background, somewhat out of focus, smoke image that can be made to travel across the viewing screen 20 at a different speed or indeed even in a different direction because of the fact that the motor 105 is controllable separately from the motor 104.

It is preferable that the discs 102, 103 be made sufficiently large relative to the beam of light they intercept so that the image picked up by the beam of light does not have a significant curvilinear motion. In one embodiment, a nine inch diameter was satisfactorily employed with discs placed about one-eighth of an inch apart.

The base on which the media is placed in the FIG. 10 embodiment need not be discs as shown but, for example, could be two belts of film. If two film belts were employed and placed across the path of light, the facing surfaces of the two belts should be close to one another to provide the desired effect. For example, if they are spaced from one another by one-eighth of an inch a meaningful effect can be achieved. It might be noted, that a similar spacing would be desired and required between the discs 102, 103 in the specific embodiment shown. As to this two belt variant of the FIG. 10 embodiment, there is the problem of the non-operative surface of each belt obstructing the light beam. The belt is made long enough in the direction of the light beam so that the non-operative portion of each belt would be so out of focus on the viewing screen as to have no meaningful effect except possibly to decrease the intensity of illumination slightly. Alternatively, appropriately angled guides or pulleys could be employed so that the film belt returns along a path that does not obstruct the light beam.

Accordingly, it shall be understood that all such variations are encompassed in the following claims.

What I claim is:

1. A projection system adapted to permit the selective projection of added pictorial material onto a main image projected from a transparency onto a viewing screen comprising:

a first optical configuration containing a first light transmitting working surface adapted to receive pictorial material, a second optical configuration containing a second light transmitting working surface adapted to receive pictorial material, said second optical configuration being optically in parallel with said first optical configuration, said first and second working surfaces being disposed relative to one another such that an operator can view both of said working surfaces at the same time while adding pictorial material to either or both of said working surfaces, lens means optically downstream from said working surfaces to project and focus onto the viewing screen whatever image is transmitted to said lens means from said working surfaces, a third optical configuration containing means to hold the transparency and an image projection device to project and focus the main image from whatever transparency is held in said means, and optically switching means for selectively optically coupling one of said working surfaces optical configuration in series with said third optical configuration, the optical relationship between said first, second and third optical configurations being such that whatever pictorial material is placed on said working surfaces may be selectively projected onto the main image by said optical switching means, said third optical configuration being optically upstream from said first and second optical configurations, whereby said optical switching means couples the output from said third optical configuration selectively to said first and second optical configurations, said optical switching means including (a) a movable mirror having a first position and a second position, said mirror when in said first position intercepting the output of said third optical configuration and reflecting said output to said first working surface optical configuration, and (b) a fixed mirror aligned with said first position of said movable mirror so that when said movable mirror is in said second position said fixed mirror intercepts the output of said third optical configuration and reflects said output to said second working surface optical configuration, said movable mirror when in said first position serving to block the output from said third optical configuration from impinging on said fixed mirror, said first optical configuration including (a) a first optical condenser optically upstream from said first working surface to converge whatever light may be transmitted from said third optical configuration through said first working surface to a first area of convergence, and (b) a first reprojection device positioned at said first area of convergence to project whatever image is carried by whatever light beam is converged thereat onto the viewing screen, and said second optical configuration including (a) a second optical condenser optically upstream from said second working surface to converge whatever light may be transmitted from said third optical configuration through said second working surface to a second area of convergence, and (b) a second reprojection device positioned at said second area of convergence to project whatever image is carried by whatever light beam is converged thereat onto the viewing screen.

2. The projection system of claim 1 further characterized by:

means for adjusting at least one of said reprojection devices so that the angular relationship between the light projected from said first reprojection device and the light projected from said second reprojection device may be adjusted to cause the images projected by said first and said second reprojection devices to be received in registration on a viewing surface.

3. A projection system adapted to permit the selective projection of added pictorial material onto a main image projected from a transparency onto a viewing screen comprising:

a first optical configuration containing a first light transmitting working surface adapted to receive pictorial material, a second optical configuration containing a second light transmitting working surface adapted to receive pictorial material, said second optical configuration being optically in parallel with said first optical configuration, said first and second working surfaces being disposed relative to one another such that an operator can view both of said working surfaces at the same time while adding pictorial material to either or both of said working surfaces, lens means optically downstream from said working surfaces to project and focus onto the viewing screen whatever image is transmitted to said lens means from said working surfaces, a third optical configuration containing means to hold the transparency and an image projection device to project and focus the main image from whatever transparency is held in said means, and optical switching means for selectively optically coupling one of said working surfaces optical configuration in series with said third optical configuration, the optical relationship between said first, second and third optical configurations being such that whatever pictorial material is placed on said working surfaces may be selectively projected onto the main image by said optical switching means, a fourth optical configuration optically in parallel with said first, second and third configurations to project a moving media onto the viewing screen, said fourth optical configuration including (a) moving media means for generating and projecting a moving media image, and (b) a third light transmitting working surface optically downstream from said moving media means and positioned to receive the moving media image, said third working surface being adapted to be covered with opaque material, whereby an operator by determining the portion of said working surface that is covered by opaque material may determine the portion of the main image on the viewing screen that has a moving media image superimposed thereon.

4. The projection system of claim 3 wherein said moving media means comprises:

a media projector for projecting the moving media image, an optical condenser between said media projector and said third working surface to converge whatever light may be projected through said third working surface to an area of convergence optically downstream from said third working surface, and projection means at said area of convergence to project whatever image is converged thereat onto the viewing screen.

5. The projection system of claim 3 wherein said moving media means comprises:

a media projector for projecting a still image representing a desired media, and mirror means to rotate through a predetermined arc and positioned to intercept and reflect light projected from said media projector.

6. The projection system of claim 5 wherein said mirror means comprises a plurality of mirrors mounted on a rotatable drum.

7. The projection system of claim 6 wherein said mirror means comprises:

a flat mirror, a spring attached to one side of said mirror and tending to pull said mirror in a first arcuate direction, and a rotatable cam having lobes on which said mirror rides when said cam is rotated, the rotation of said cam causing said mirror to rotate on said lobes in a second arcuate direction opposite to said first arcuate direction.

8. The projection system of claim 5 further characterized by:

a rotatable rotation prism positioned to intercept light reflected from said mirror means.

9. The projection system of claim 3 wherein said moving media means comprises:

a light beam projector to provide a light beam, first movable media image carrying means intercepting said light beam to provide a light beam modulated with a first moving media image.

second movable media image carrying means spaced from said first media image carrying means and positioned to intercept said modulated light beam to further modulate said light beam with said second moving media image.

10. The projection system of claim 9 wherein said moving media means further comprises:

a rotatable rotation prism positioned to intercept said light beam as modulated by said first and second images.

11. The projection system of claim 9 wherein:

said first movable media image carrying means comprises: (a) a first rotatable light transmitting disc carrying a first media image thereon and (b) first motor means to rotate said first disc, and said second movable media image carrying means comprises: (a) a second light transmitting disc carrying a second media image thereon and (b) second motor means to rotate said second disc independently of said first disc.

12. A projection system for projecting a moving image onto a desired surface comprising:

a projector for projecting a still image, rotatable mirror means positioned to intercept and reflect light projected from said projector, means for periodically rotating said mirror through a predetermined arc, an optical condenser positioned to receive light reflected from said mirror to converge said light toward an area of convergence, a projection device at said area of convergence positioned to project whatever image is converged thereat onto the desired surface, and a light transmitting work surface between said optical condenser and said projection device, said work surface being covered with opaque material whereby an operator may determine the portion of the desired surface that is covered by whatever light or image is being projected by determining the portion of said work surface that is covered with said opaque material.

13. The projection system of claim 12 wherein said rotatable mirror means is a plurality of mirrors mounted on a rotatable drum.

14. The projection system of claim 12 wherein:

said rotatable mirror means includes a flat mirror, and said means to rotate said rotatable mirror means includes (a) a spring attached to one side of said mirror and tending to pull said mirror in a first arcuate direction, and (b) a rotatable cam having lobes on which said mirror rides when cam is rotated, the rotation of said cam causing said mirror to ride on said lobes to rotate in a second arcuate direction opposite to said first arcuate direction.

References Cited

UNITED STATES PATENTS

| | | | |
|---|---|---|---|
| 1,857,135 | 5/1932 | Brenkert et al. | |
| 2,510,621 | 6/1950 | De France | 352—133 |
| 2,525,957 | 10/1950 | Schuler. | |
| 2,652,745 | 9/1953 | Quinn. | |
| 2,666,357 | 1/1954 | Graham et al. | 352—108 |
| 2,677,306 | 5/1954 | Dodeman et al. | |
| 2,693,131 | 11/1954 | Mihalakis. | |
| 2,754,722 | 7/1956 | Howell et al. | |
| 2,813,457 | 11/1957 | Fitzgerald. | |
| 2,937,569 | 5/1960 | Wilton. | |
| 2,977,845 | 4/1961 | Boone. | |
| 3,036,496 | 5/1962 | Frederick et al. | |
| 3,077,816 | 2/1963 | Hirsch | 352—69 |
| 3,160,889 | 12/1964 | Giacometti | 352—94 |
| 3,283,652 | 11/1966 | Busch. | |
| 3,336,681 | 8/1967 | Minasy. | |
| 2,727,429 | 12/1955 | Jenkins | 352—89 |
| 3,030,856 | 4/1962 | Jordan | 350—4 |

NORTON ANSHER, Primary Examiner

R. M. SHEER, Assistant Examiner

U.S. Cl. X.R.

353—34, 44, 48, 49, 51, 82, 94, 99

PO-1050
(5/69)

UNITED STATES PATENT OFFICE
CERTIFICATE OF CORRECTION

Patent No. 3,472,587           Dated   October 14, 1969

Inventor(s)   Stephen A. Liguori

It is certified that error appears in the above-identified patent and that said Letters Patent are hereby corrected as shown below:

Column 12, line 31 "tioned in the base unit below the" is completely left out and part of the first line is repeated.

Column 13, line 60 "lens" should be --lenses--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents